(12) United States Patent
Wurtz et al.

(10) Patent No.: US 9,696,603 B2
(45) Date of Patent: Jul. 4, 2017

(54) PLASMONIC SWITCH DEVICE AND METHOD

(71) Applicant: KING'S COLLEGE LONDON, London (GB)

(72) Inventors: Gregory Wurtz, London (GB); Anatoly Zayats, London (GB); Cillian McPolin, London (GB); Andres David Barbosa Neira, London (GB); Pavel Ginzburg, London (GB)

(73) Assignee: KING'S COLLEGE LONDON, London (GB)

( * ) Notice: Subject to any disclaimer, the term of this patent is extended or adjusted under 35 U.S.C. 154(b) by 0 days.

(21) Appl. No.: 15/110,680

(22) PCT Filed: Jan. 9, 2015

(86) PCT No.: PCT/GB2015/050037
§ 371 (c)(1),
(2) Date: Jul. 8, 2016

(87) PCT Pub. No.: WO2015/104555
PCT Pub. Date: Jul. 16, 2015

(65) Prior Publication Data
US 2016/0349594 A1 Dec. 1, 2016

(30) Foreign Application Priority Data

Jan. 10, 2014 (GB) .................................. 1400393.3
Jan. 10, 2014 (GB) .................................. 1400398.2
Jul. 11, 2014 (GB) .................................. 1412388.9

(51) Int. Cl.
*G02B 6/122* (2006.01)
*G02B 26/00* (2006.01)
(Continued)

(52) U.S. Cl.
CPC ........... *G02F 1/225* (2013.01); *G02B 6/1226* (2013.01); *G02B 26/001* (2013.01);
(Continued)

(58) Field of Classification Search
CPC ....... G02B 6/1226; G02B 26/001; G02F 1/19; G02F 1/21; G02F 1/225; G02F 1/0126
(Continued)

(56) References Cited

U.S. PATENT DOCUMENTS 9,105,791 B1 * 8/2015 Dyer .................... H01L 31/1127
9,244,333 B1 * 1/2016 Brown ....................... G02F 3/02
(Continued)

FOREIGN PATENT DOCUMENTS

CN 103605189 A 2/2014
KR 101238052 B1 2/2013
(Continued)

OTHER PUBLICATIONS

International Application No. PCT/GB2015/050037 International Search Report and Written Opinion dated Jul. 7, 2015 (18 pages).
(Continued)

*Primary Examiner* — Akm Enayet Ullah
(74) *Attorney, Agent, or Firm* — Keller Jolley Preece

(57) ABSTRACT

A plasmonic switching device and method of providing a plasmonic switching device. An example device includes a resonant cavity and an electromagnetic radiation feed arranged to couple electromagnetic radiation into the resonant cavity and at least one plasmonic mode. The resonant cavity is arranged to be switchable between: a first state in which the resonant cavity has an operational characteristic selected to allow resonance of the electromagnetic radiation at a frequency of the at least one plasmonic mode; and a second state in which the operational characteristic of the resonant cavity is adjusted to inhibit resonance of the
(Continued)

electromagnetic radiation at a frequency of the at least one plasmonic mode.

20 Claims, 6 Drawing Sheets

(51) Int. Cl.
  *G02F 1/19* (2006.01)
  *G02F 1/225* (2006.01)
  *G02F 1/01* (2006.01)
  *G02F 1/21* (2006.01)
  *G02B 6/12* (2006.01)

(52) U.S. Cl.
  CPC .............. *G02F 1/0126* (2013.01); *G02F 1/19* (2013.01); *G02F 1/21* (2013.01); *G02B 2006/12145* (2013.01); *G02F 2001/213* (2013.01); *G02F 2202/30* (2013.01); *G02F 2203/10* (2013.01); *G02F 2203/15* (2013.01)

(58) Field of Classification Search
  USPC ........................................................ 359/320
  See application file for complete search history.

(56) References Cited

U.S. PATENT DOCUMENTS

| 2009/0238511 | A1* | 9/2009 | Quitoriano | .............. | G02F 1/025 |
| | | | | | 385/2 |
| 2012/0019901 | A1* | 1/2012 | Mazumder | ............ | G02F 1/1326 |
| | | | | | 359/320 |
| 2013/0301983 | A1* | 11/2013 | Mazumder | ........... | G02B 6/1226 |
| | | | | | 385/16 |
| 2014/0023321 | A1* | 1/2014 | Lu | ............................ | G02B 6/10 |
| | | | | | 385/40 |
| 2014/0358128 | A1* | 12/2014 | Montazeri | ............. | H01L 31/054 |
| | | | | | 604/890.1 |

FOREIGN PATENT DOCUMENTS

| KR | 101362130 B1 | 2/2014 |
| WO | 02/103447 A1 | 12/2002 |
| WO | 2011/033339 A1 | 3/2011 |
| WO | 2013/144559 A1 | 10/2013 |

OTHER PUBLICATIONS

Jianhong Zhou et al., "Fano resonance of nanoparticles embedded in Fabry-Perot cavities," Optics Express, vol. 21, No. 10, May 20, 2013 (6 pages).

Timothy J. Davis et al., "Surface plasmon modes and their interactions in multilayer thin-film structures," Proceedings of SPIE, vol. 7404, Aug. 20, 2009 (16 pages).

Dentai A et al., "Electrically tunable semiconductor Fabry-Perot filter," IEEE Photonics Technology Letters, IEEE vol. 6, No. 5, May 1, 1994 (4 pages).

Anne-Laure Baudrion et al., "Coupling efficiency of light to surface plasmon polariton for single subwavelength holes in a gold film," Optics Express, vol. 16, No. 5, Jan. 1, 2008 (10 pages).

Application No. GB1400398.2 Search Report under Section 17 dated Sep. 4, 2014 (1 page).

Application No. GB1412388.9 Search Report under Section 17 dated Jan. 8, 2015 (1 page).

Application No. GB1400393.3 Search Report under Section 17 dated Sep. 8, 2014 (1 page).

* cited by examiner

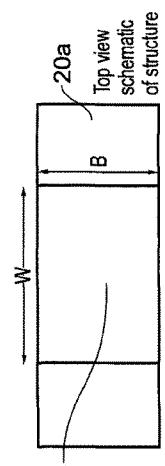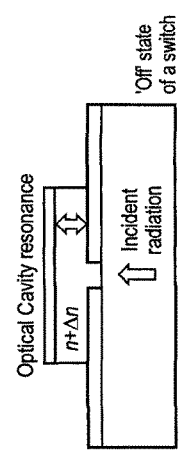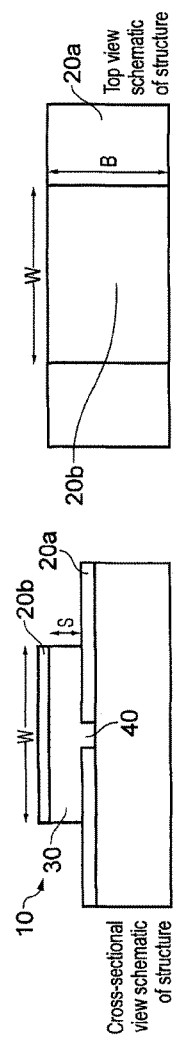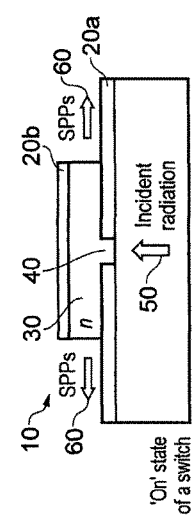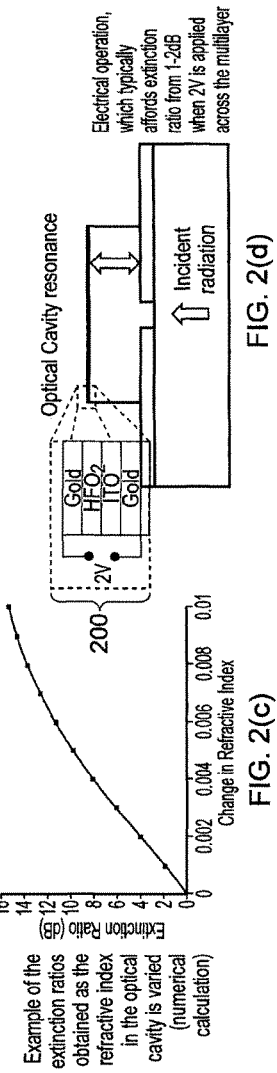

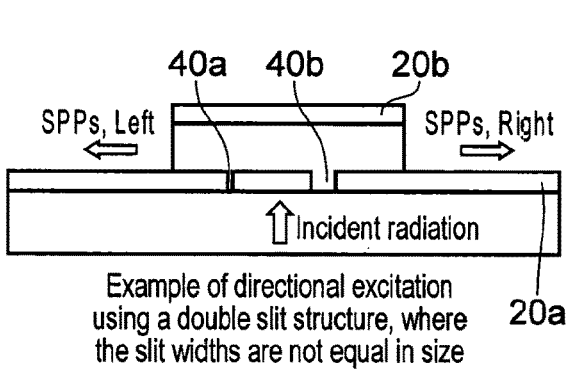

FIG. 3(a) Example of directional excitation using a double slit structure, where the slit widths are not equal in size

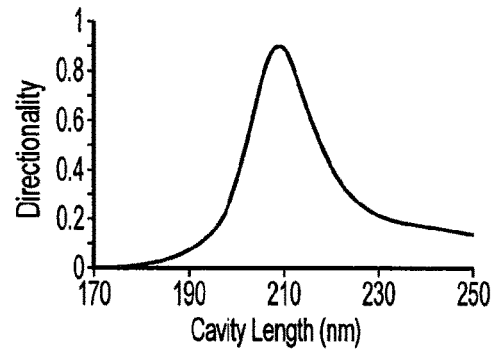

FIG. 3(b) Example of directionality for a double slit structure as the cavity length is varied (numerical calculation)

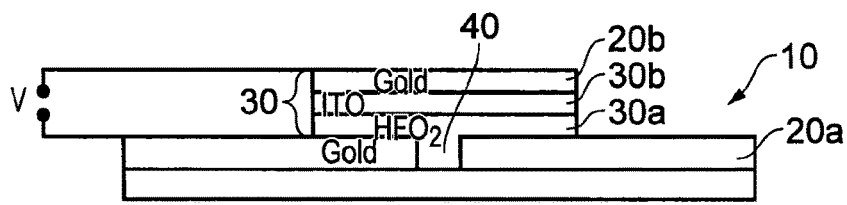

FIG. 4(a) Multilayer system used in the plasmonic cavity

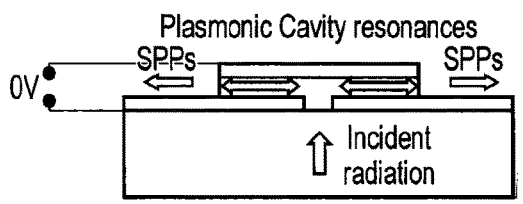

FIG. 4(b) 'On' state- plasmonic resonances in the cavity, located either side of the slit, generate single interface SPPs

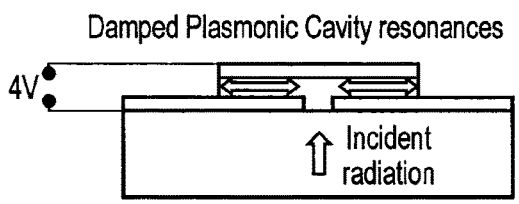

FIG. 4(c) 'Off' state- losses experienced by the plasmonic modes in the cavity inhibit the excitation of SPPs on the adjacent gold film

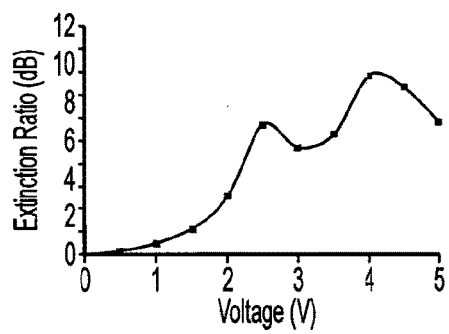

FIG. 4(d) Example of extinction ratios obtained as the applied voltage is varied (numerical calculation)

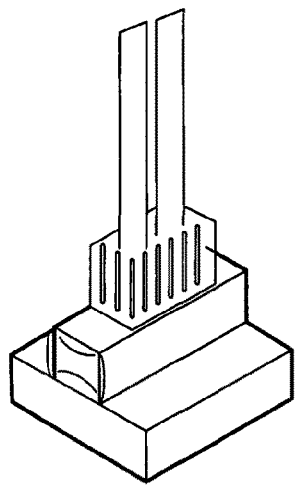 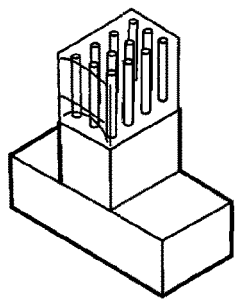 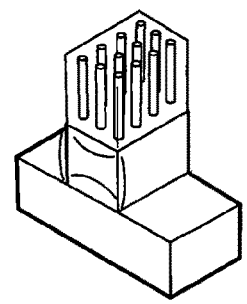
FIG. 5(a)      FIG. 5(b)      FIG. 5(c)
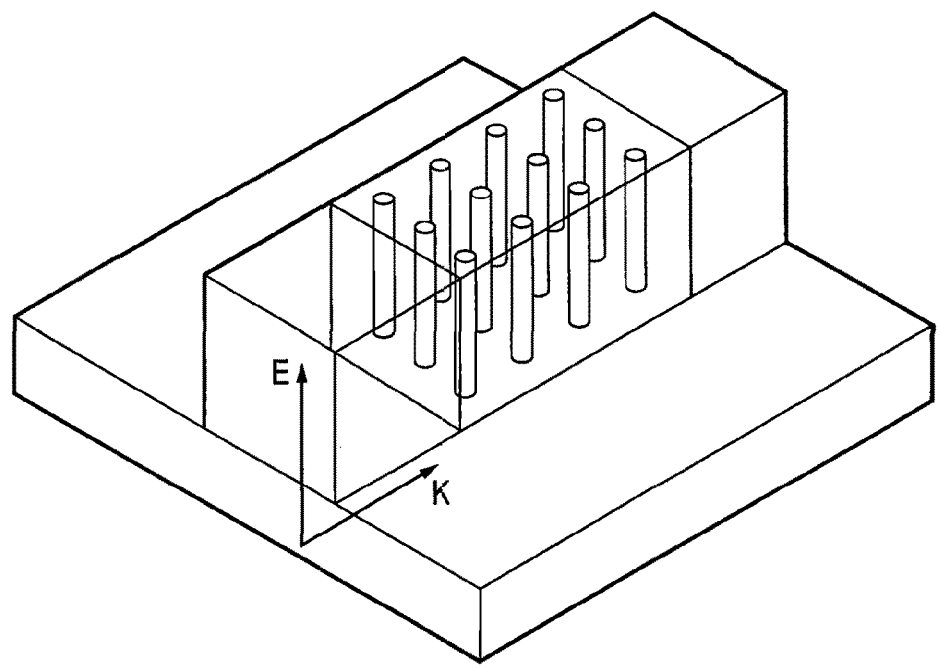
FIG. 6

PLASMONIC SWITCH DEVICE AND METHOD

FIELD OF THE INVENTION

Aspects and embodiments relate to: a plasmonic switching device and a method of providing a plasmonic switching device; an electromagnetic waveguide transmission modulation device and method of providing such a device; and a further electromagnetic waveguide transmission modulation device and method of providing such a device.

BACKGROUND

Photonic Circuits can be Equipped with Photonic Components which have a Greater speed and can handle larger bandwidths when compared to equivalent electronic components. However, such photonic components may be prevented from attaining particularly compact, for example, nanoscale, dimensions as a result of diffraction.

One approach to overcome the diffraction limit recognises that utilisation of surface plasmon polaritons (SPPs) can be useful. Such SPPs arise due to the coupling of light to free electron oscillations at an interface between a dielectric and a metal. The ability to control and manipulate light on the nanoscale via SPP modes can offer a means to construct compact optical components for use in applications including: data storage, information technologies and sensing. In order for plasmonic circuitry to be realized, a component which is able to efficiently operate to "switch" a signal is required. It is recognised that switching may occur by means of alteration of propagation characteristics or alteration of excitation of SPPs.

Plasmonic systems may be implemented to demonstrate active functionalities. Such plasmonic systems may incorporate, for example, thermo- and electro-optic media, quantum dots, and/or photochromic molecules and such systems are achieving incremental performance progress in relation to switching and modulation applications. However, long switching times (>nanosecond) and/or the need for relatively strong control energy (~$\mu J/cm^2$) to observe sensible signal modulation (35% to 80%) can limit the practical use of such structures in signal processing or other active opto-electronic nanodevices. It will be appreciated that in order for active plasmonics to offer a viable technological platform, both the magnitude and speed of an employed nonlinearity, together with the spectral/spatial tunability of that effect must be improved.

It is desired to provide an improved plasmonic device.

Optical components play a key role in industry today and can frequently be found in common instrumentation devices. Such devices are used to serve a broad range of applications, in areas as varied as: communications systems, health and safety, security systems, and biometrics. Optical components provide a means to implement some key functionalities and can allow the harvest, generation, conversion, processing and other manipulation of optical signals. There is constant demand for optical devices to allow or support higher integration, portability, speed, and bandwidth, whilst performing with reduced power consumption.

It is desired to provide an improved optical signal manipulation device.

SUMMARY

Accordingly, a first aspect provides a plasmonic switching device comprising: a resonant cavity formed between surfaces, one of the surfaces comprising a plasmonic system operable to support at least one plasmonic mode; an electromagnetic radiation feed arranged to couple electromagnetic radiation into the resonant cavity and the at least one plasmonic mode; wherein the resonant cavity is arranged to be switchable between: a first state in which the resonant cavity has an operational characteristic selected to allow resonance of the electromagnetic radiation at a frequency of the at least one plasmonic mode such that excitation of the at least one plasmonic mode is inhibited in the plasmonic system; and a second state in which the operational characteristic of the resonant cavity is adjusted to inhibit resonance of the electromagnetic radiation at a frequency of the at least one plasmonic mode such that the at least one plasmonic mode is excited in the plasmonic system.

The first aspect recognises that a cavity fed with a signal of an appropriate wavelength, or a cavity having appropriate dimensions for a signal of a given wavelength, can meet conditions for resonance of the cavity.

Furthermore, the first aspect recognises that surface plasmon polaritons (SPPs) can be excited at an interface between a metal and another dielectric material. SPPs can be guided along a metal-dielectric interface. The first aspect recognises that at least one surface of a resonant cavity may be formed from appropriate materials to form a plasmonic system, and that under appropriate illumination conditions, incident photons may couple with surface plasmons at the interface and result in excitation of a SPP which can propagate along the surface of the plasmonic structure.

The first aspect recognises that if a plasmonic structure forming part of a resonant cavity is illuminated by electromagnetic radiation in, for example, the optical region of the spectrum, light may couple directly to SPPs on the plasmonic structure by scattering from the radiation feed. Excitation of a plasmonic mode will typically require phase matching by scattering from the radiation feed. Optical resonance in the cavity is achieved via an optical Fabry-Perot mode of the cavity. As a result of destructive interference between the plasmonic feed and the Fabry-Perot mode, the SPP intensity exhibits sharp minima at, or close to, the resonant frequencies of the optical cavity modes. That phenomenon may be understood in terms of a Fano resonance, which describes interaction between coupled scattering channels. This coherent effect may arise whenever scattering may take place via two pathways, either directly into a continuum background signal, or resonantly through a discrete channel towards the continuum. In this case, the two channels correspond to the sharp resonance from the Fabry-Perot resonator and the non-resonant transmission of the plasmonic feed, for example, a opening in a surface comprising a slit.

Accordingly, provided that operational characteristics of the resonant cavity are appropriately configured and adjustable, the resonant cavity can be arranged to be switchable between: a first state in which the resonant cavity has an operational characteristic selected to allow resonance of the electromagnetic radiation at a frequency of the at least one plasmonic mode such that excitation of the at least one plasmonic mode is inhibited in the plasmonic system and a second state in which the operational characteristic of the resonant cavity is adjusted to inhibit resonance of the electromagnetic radiation at a frequency of the at least one plasmonic mode such that the at least one plasmonic mode is excited in the plasmonic system.

It will, of course, be appreciated that since an SPP is itself a hybridised electromagnetic oscillation, it has an associated wavelength. Compared with incident photons which trigger SPPs, the wavelength associated with the SPP can be significantly shorter.

The first aspect recognises that a plasmonic device, such as a switch, may be based on a cavity structure, the operational parameters or characteristic of which can be adjusted, which can, in turn, allow a signal to be controlled. For example, the switch may be determined to be in an "on" or "off" state in dependence upon detected SPPs. In particular, the first aspect recognises that by adjusting resonance conditions of a cavity, a switch may be implemented.

Furthermore, owing to its design, a device in accordance with the first aspect may be integrated with Vertical Cavity Surface Emitting Lasers (VCSELs) to provide an appropriate electromagnetic radiation source. Such an arrangement may, for example, provide a means to provide a compact integrated device for efficient SPP generation, modulation and switching.

In one embodiment, the plasmonic system surface comprises an interface between a metal and a dielectric. Accordingly, it will be appreciated that such an arrangement, provided materials are selected appropriately, can result in a plasmonic structure. The metal may, for example, comprise a gold, copper or silver film, foil or layer. The layer may comprise any appropriately selected material in which the real part of the material permittivity can be tuned to be negative in the spectral region of device operation. Examples of such materials include, for example, appropriately doped semiconductors. The plasmonic structure may comprise the entire of one surface or a proportion of one surface. In some embodiments, both or all surfaces defining the resonant cavity may comprise a plasmonic structure.

In one embodiment, the operational characteristic comprises at least one effective dimension of the cavity. Accordingly, a device in accordance with described aspects and embodiments may function by utilising either optical or plasmonic resonances, in dependence upon device dimensions. One method of operation comprises taking appropriate steps to inhibit the coupling of electromagnetic radiation, for example, radiation in the optical region of the spectrum, to SPPs which exist at the surface of the plasmonic structured surface, by employing optical Fabry Perot modes which can be supported by the cavity structure of the device. Such Fabry Perot modes can be supported by the cavity structure when feed radiation, for example, in the optical region of the spectrum is introduced into the cavity, provided the separation between reflective surfaces of the cavity, for example, metal layers, is appropriately selected.

In one embodiment, the dimension comprises an effective optical spacing between the surfaces. Accordingly, to switch between states the optical path inside the cavity perpendicular to the reflective surfaces, is constructed or formed such that it can be tuned to reduce (or increase) destructive interference. Active control may be achieved by, for example, utilising a nonlinear Kerr effect. By incorporating a nonlinear material into the cavity, the refractive index of the material inside the cavity may be optically modulated to yield the desired switching.

In one embodiment, the spacing between the surfaces comprises: a spacer layer configured to have a variable effective refractive index. In one embodiment, the refractive index varies upon application of a voltage across the spacer layer utilising refractive index modulation stemming from an increase in carrier concentration in the spacer layer. Accordingly, the switching of the device may be operated electrically. For example, in some embodiments, utilising refractive index modulation which stems from an increase in carrier concentration in, for example, Indium Tin Oxide (ITO), can be successfully used as a switching mechanism. In order to employ such an effect, embodiments may be provided according to which a thin multilayer structure replaces at least one of the surface structures. In one embodiment, the thin multilayer structure may comprise two optically transparent gold films separated by a layer of each of Indium Tin Oxide (ITO) and Hafnium Oxide (HfO). When a voltage is applied, the index modulation enhances reflection from the interface, hence effectively modifying the resonant conditions of the Fabry-Perot cavity. In one embodiment, the spacer layer comprises a multilayer structure formed from at least one of: Indium Tin Oxide, Hafnium Oxide, Gold, Copper, or Silver. In some embodiments, the reflectivity of the one or more surfaces of the cavity may be dynamically altered by appropriate application of appropriately chosen voltage, light, electromagnetic radiation or other similar means.

In one embodiment, the electromagnetic radiation feed comprises: a source of electromagnetic radiation which enters the cavity via at least one opening provided in one of the surfaces, the opening being arranged such that photons scattered from the feed are coupleable to the plasmonic system. The opening may comprise a slit, a hole, or any other appropriately dimensioned feed.

In one embodiment, the at least one opening is provided in the surface comprising the plasmonic system. In some embodiments, a grating or other similar optical source or structure can be arranged to both feed the cavity and generate SPPs when exciting the plasmonic mode. In some embodiments, a hemispherical upper reflector can be used to provide the necessary conditions for switching.

In one embodiment, the at least one opening is configured symmetrically within the device such that excitation of the plasmonic mode in the device is symmetrical. In one embodiment, the at least one opening is arranged to have different dimensions to another of the at least one openings, such that excitation of the plasmonic mode in the device is asymmetrical. It will be appreciated that the lineshape of the Fano resonance is heavily dependent on the dimensions of the resonant cavity structure and illumination conditions. That is to say, an asymmetry parameter can be controlled by altering the effective coupling parameter between the continuum provided by an opening, for example, a slit, and the discrete channel provided by the cavity, in addition to varying the phase between the two channels. In some embodiments, the phase change associated with the optical resonance can be harnessed to modify the phase of the SPPs launched by, for example, a slit, thus allowing for a degree of control over the direction of SPP excitation when phase matching structures, for example, double slits of different widths, are employed.

In one embodiment, the device further comprises: a plasmonic mode detector. Accordingly, the detector may be arranged to detect whether the device is operating in a manner in which excitation of at least one plasmonic mode is inhibited or supported in the plasmonic system, and thus determine whether the device is in an "off" or "on" state.

A second aspect provides a method of providing a plasmonic switching device comprising: forming a resonant cavity between surfaces, one of the surfaces comprising a plasmonic system operable to support at least one plasmonic mode; arranging an electromagnetic radiation feed to couple electromagnetic radiation into the resonant cavity and the at least one plasmonic mode; arranging the resonant cavity to be switchable between: a first state in which the resonant cavity has an operational characteristic selected to allow resonance of the electromagnetic radiation at a frequency of the at least one plasmonic mode such that excitation of the at least one plasmonic mode is inhibited in the plasmonic system; and a second state in which the operational characteristic of the resonant cavity is adjusted to inhibit resonance of the electromagnetic radiation at a frequency of the at least one plasmonic mode such that the at least one plasmonic mode is excited in the plasmonic system.

In the case of a plasmonic cavity, two surfaces may comprise a plasmonic system.

In one embodiment, the plasmonic system surface comprises an interface between a metal and a dielectric.

In one embodiment, the operational characteristic comprises: effective reflectivity of at least one of the surfaces of the cavity.

In one embodiment, it will be appreciated that a static electric field can be used to alter or change the reflectivity of at least one of the surfaces. That is to say, the reflectivity or mirrored nature of at least one of the surfaces can be changed by an appropriately applied static electric field.

In one embodiment, the operational characteristic comprises at least one effective dimension of the cavity.

In one embodiment, the dimension comprises an effective spacing between the surfaces.

In one embodiment, the method comprises configuring the spacing between the surfaces as a dielectric configured to have a variable effective refractive index.

In one embodiment, the method comprises arranging the refractive index of the dielectric or spacer layer to vary upon application of a voltage across the dielectric utilising refractive index modulation stemming from an increase in carrier concentration in the dielectric.

In one embodiment, the method comprises: forming a surface of the cavity as a multilayer structure formed from at least one of: Indium Tin Oxide, Hafnium Oxide, Gold, Copper, or Silver.

In one embodiment, the method comprises providing an electromagnetic radiation feed comprising: a source of electromagnetic radiation which enters the cavity via at least one opening provided in one of the surfaces, the opening being arranged such that photons scattered from the slit are coupleable to the plasmonic system.

In one embodiment, the method comprises: providing at least one opening in the surface comprising the plasmonic system.

In one embodiment, the method comprises: arranging the at least one opening to have different dimensions to another of the at least one opening, such that excitation of the plasmonic mode in the device is asymmetrical.

In one embodiment, the method further comprises: providing a plasmonic mode detector.

The general principle of operation of the first and second aspects is such that an electromagnetic feed can be integrated into a mirror from a Fabry Perot cavity, that cavity having metallic or dielectric mirrors. The feed may be non-resonant or have a very broad resonance, while the Fabry Perot cavity supports sharp resonances (in the spectral domain). When the Fabry Perot cavity is driven close to resonance, it turns off the feed through destructive interferences (this is called a Fano resonance).

Accordingly, one further implementation of the principle of the first aspect may provide: a switching device comprising: a resonant cavity formed between surfaces and an electromagnetic radiation feed arranged to couple electromagnetic radiation into the resonant cavity; wherein the resonant cavity is arranged to switch the electromagnetic feed between: a first state in which the resonant cavity has an operational characteristic selected to allow said cavity to be is driven close to resonance such that passage of the electromagnetic feed through the cavity is inhibited; and a second state in which an operational characteristic of the resonant cavity is adjusted to inhibit cavity resonance such that passage of the electromagnetic feed through the cavity is supported.

A corresponding method may also be provided,

A third aspect provides an electromagnetic waveguide transmission modulation device comprising: at least one hyperbolic metamaterial element coupleable to the waveguide; the hyperbolic metamaterial element being arranged to be adjustable between: a first mode in which the metamaterial element is configured to support a resonant mode matched to a propagation vector of a waveguide transmission mode supported by the waveguide such that propagation of the waveguide transmission mode along the waveguide is affected; and a second mode in which the metamaterial element is configured to inhibit support of the resonant mode matched to the propagation vector of the waveguide transmission mode, such that interruption of propagation of the waveguide transmission mode along the waveguide is prevented.

Aspects recognise that whilst high-speed optical modulators are available commercially with a speed ranging from 10 MHz up to 50 Ghz, those optical modulators use a Mach-Zehnder interferometer with an optical nonlinear material (usually Lithium Niobate) in order to achieve those high speeds. Such optical modulators may be on-chip integrated, but typically have a large footprint.

Aspects also recognise that the integration of optical modulators on-chip may be performed such that an electro-optic effect is generated using a very fast electrical signal in the order of tens of GHz. However, there are limitations associated with use of electro-optic effect, since it requires considerable power for switching the optical properties of a material and the speed is typically limited by interconnections carrying an electrical signal.

Aspects and embodiments recognise that there is a need to provide a means to realise a small footprint, ultrafast, low consumption, integrated optical element, which may be used to provide a range of optical functionalities whilst being industrially transferable and CMOS compatible. Some embodiments may, for example, provide a device which can be used as an optical sensor to convert chemical information into optical data. Other embodiments may provide a device which can be used as a modulator, switch, or amplifier to manipulate and process photonic signals.

Some aspects and embodiments may offer improved functionality or performance since they may be integrally formed as part of known silicon technologies, may be relatively simply manufactured and provide improved operational speed (>100 GHz for electronically drive devices), switching time (<ns for electronically drive devices) and/or bandwidth.

Aspects and embodiments described herein recognise that the optical properties of metamaterial systems based on the arrangement of nanostructure components present an opportunity to design novel optical devices which may offer useful properties. Electromagnetic metamaterials can exhibit high sensitivity to their surroundings and thus can offer a means to create a sensitive device.

Sensing is one possible application of the proposed invention. Aspects recognise that whilst there are various commercial sensors available on the marketplace to address demands in biomedical-sensing, medical diagnostics, or even toxic materials identification, a device in accordance with aspects and embodiments may offer improvement. Aspects recognise that an optical approach to sensing generally relies on changes in the transmittance or reflectance of the device based on environmental changes occurring in the proximity of the device. Such an approach may be limited by the sensitivity level of such devices, since the sensitivity is constrained by weak light-matter interactions, as with purely transparent molecules, for example. A sensitivity improvement may be achieved by allowing for detection of nanoscale interactions with molecules. Efficient approaches relying on surface waves and other resonant effects involving surface plasmons can be implemented. Aspects may combine such approaches whilst also allowing a device to be spatially integrated in a waveguide, thus enabling, for example: high throughput, multiplexing, and/or remote sensing devices.

Aspects and embodiments may provide an improved optical modulator. Aspects recognise that the basic function of an optical modulator is to encode one or more data streams on a carrier wave. The density of the information processed (or the channel capacity) is directly proportional to the carrier frequency, thus making the use of optical signals operating at GHz-THz attractive in comparison to low frequency electronics typically operating in the lower GHz regime. However, most commercial modulators display limited performance since the driving electronics cannot be much faster than 100 GHz due to the natural limitations of parasitic resistance-capacitance times. Aspects and embodiments may offer a means to overcome such issues.

The electromagnetic waveguide transmission modulation device may comprise: at least one hyperbolic metamaterial element coupleable to the waveguide. The hyperbolic metamaterial may comprise an anisotropic material which has a negative permittivity in one direction and a positive permittivity in a transverse direction, resulting in a material which displays behaviour in one direction which are similar to that of metallic crystals and yet displays dielectric material characteristics in another direction. The dispersion relation of the hyperbolic metamaterial is such that for a given frequency of electromagnetic radiation and a given set of material parameters is defined by a hyperboloid.

The element may be permanently coupled or integrally formed with the waveguide.

The hyperbolic metamaterial element being arranged to be adjustable between: a first mode in which the metamaterial element is configured to support a resonant mode matched to a propagation vector of a waveguide transmission mode supported by the waveguide such that propagation of the waveguide transmission mode along the waveguide is affected. The effect induced may be such that propagation of the waveguide transmission mode along the waveguide is prevented.

In a second mode, the metamaterial element is configured to inhibit support of the resonant mode matched to the propagation vector of the waveguide transmission mode, such that interruption of propagation of the waveguide transmission mode along the waveguide is prevented. That is to say, reflection and other similar effects which may be induced in a transmission mode on inclusion of a different material in a waveguide are substantially non existent.

In one embodiment, the metamaterial element is configured to allow adjustment between the first and second mode, by means of modification of optical properties of the metamaterial element. Aspects and embodiments described recognise that use of a plasmonic or hyperbolic metamaterial element can result in a highly sensitive device. That sensitivity stems from the sensitivity of strong plasmonic coupling between individual nanostructure elements in a metamaterial to external perturbations, for example, as a result of a physical or chemical environmental change. Provision of, for example, a material sensitive to environmental change as an element within said metamaterial causes a change to said metamaterial as the surrounding environment changes. That change, for example may result in a change to the effective permittivity of the metamaterial, which can be detected by various appropriately chosen techniques.

According to some embodiments, it will be appreciated that monitoring the transmission, reflection and/or absorption characteristics of the waveguide can be used to detect or monitor the presence of a change in environment surrounding the waveguide.

In one embodiment, the device further comprises an adjuster and the metamaterial element is arranged to be adjusted by electro-optical, magneto-optical, acousto-optical or nonlinear optical interaction by the adjuster. Accordingly, active control of a device may be provided, the adjuster being configured to allow alteration of the optical properties of the metamaterial element by means of application of an appropriate electro-optical, magneto-optical, acousto-optical or nonlinear optical interaction by the adjuster In one embodiment, the metamaterial element is coupled to the waveguide in a manner which enables dynamic control over transmission, reflection and/or absorption properties of the waveguide. Accordingly, a device in accordance with some aspects and embodiments can be configured or designed to operate at a frequency close to an inflection point of a transmission versus frequency characteristic of a metamaterial element. In a configuration where a device is in the "off" position, for example, the transmission of the device can be chosen to be maximal/minimal or intermediate in dependence upon an envisaged application. If the transmission is maximal, the propagation of light in the waveguide is not altered by the presence of the device, since the device is configured such that the impedance of the waveguide and device is matched. It will be appreciated that small changes in the optical properties of a device will then affect the transmission of the waveguide.

In one embodiment, the hyperbolic metamaterial element is integrally formed with the waveguide. Accordingly, a device can be directly integrated with waveguide, for example, silicon waveguide, technology. If integrated, a device in accordance with aspects and embodiments may provide a smaller device footprint, increase possible operating frequency and bandwidth and reduce power consumption when compared with alternative approaches.

In one embodiment, the metamaterial element is formed adjacent the waveguide. In one embodiment, the metamaterial element is formed in-line with the waveguide. In one embodiment, the metamaterial element is formed within the waveguide.

In one embodiment, the metamaterial element comprises: a support and a plurality of nanostructure elements comprising a metallic material; the plurality of nanostructure elements being configured on the support to allow said structure to act as a hyperbolic metamaterial, wherein the nanostructure elements are configured to cause a change in permittivity of the metamaterial on application of an external trigger to adjust the device between the first mode and the second mode. Accordingly, it will be appreciated that various forms of metamaterial may be used to implement a device in accordance with aspects and embodiments described herein. In one embodiment, the metamaterial comprises an electromagnetic metamaterial. In one embodiment, the metamaterial comprises an optical metamaterial. In one embodiment, the adjacent nanostructure elements are configured on the support such that they are electromagnetically coupled. In one embodiment, the nanostructure elements are configured such that the electromagnetic field of one nanostructure element spatially overlaps that of adjacent nanostructure elements. In one embodiment the metallic material comprises a metal, an ∈ negative material, such as an appropriately doped semiconductor or similar.

In one embodiment, the plurality of nanostructure elements comprise elongate nanostructure elements arranged such that their elongate axis is substantially parallel to the elongate axis of other nanostructure elements.

In some embodiments, the nanostructure elements are configured as an array on the support. In some embodiments, the spacing between adjacent elements is chosen to be small in comparison to the wavelength of radiation intended for transmission by the waveguide. The array may comprise an irregular array. In one embodiment, the array comprises a substantially regular array. In one embodiment, the nanostructure elements comprise a plurality of metallic nanorods. In one embodiment, the nanostructure elements are embedded within a dielectric matrix. The metamaterial element may comprise a plurality of metallic nanorods of tunable diameter, length, and spacing distance which are aligned with respect to one another and embedded in a dielectric matrix. The geometric tunability of the metamaterial provides extensive control over both the bandwidth and the operating frequency of the device.

In one embodiment, the device comprises a plurality of metamaterial elements. Aspects and embodiments may allow ultrafast (THz) operation speeds with tunable broadband capacity, since a device may be configured to allow for operation with a plurality of operating frequencies. Such a device may be configured to deal with a plurality of operating frequencies in a serial manner. Accordingly, a plurality of metamaterial elements may be provided, each matched to a different propagation vector of a waveguide transmission mode.

A fourth aspect provides a method of providing a electromagnetic waveguide transmission modulation device, the method comprising: coupling at least one hyperbolic metamaterial element to the waveguide; arranging the hyperbolic metamaterial element to be adjustable between: a first mode in which the metamaterial element is configured to support a resonant mode matched to a propagation vector of a waveguide transmission mode supported by the waveguide such that propagation of the waveguide transmission mode along the waveguide is affected; and a second mode in which the metamaterial element is configured to inhibit support of the resonant mode matched to the propagation vector of the waveguide transmission mode, such that interruption of propagation of the waveguide transmission mode along the waveguide is prevented.

In one embodiment, the method comprises: configuring the metamaterial element to allow adjustment between the first and second mode, by means of modification of optical properties of the metamaterial element.

In one embodiment, the method comprises: arranging an adjuster and the metamaterial element such that the metamaterial element can be adjusted by electro-optical, magneto-optical, acousto-optical or nonlinear optical interaction by the adjuster.

In one embodiment, the method comprises: coupling the metamaterial element to the waveguide in a manner which enables dynamic control over transmission, reflection and/or absorption properties of the waveguide.

In one embodiment, the method comprises: integrally forming the hyperbolic metamaterial element with the waveguide.

In one embodiment, the metamaterial element is formed adjacent the waveguide.

In one embodiment, the metamaterial element is formed in-line with the waveguide.

In one embodiment, the metamaterial element comprises: a support and a plurality of nanostructure elements comprising a metallic material; the plurality of nanostructure elements being configured on the support to allow said structure to act as a hyperbolic metamaterial, wherein the nanostructure elements are configured to cause a change in permittivity of the metamaterial on application of an external trigger to adjust the device between the first mode and the second mode.

In one embodiment, the metamaterial comprises an electromagnetic metamaterial.

In one embodiment, the metamaterial comprises an optical metamaterial.

In one embodiment, the method comprises: configuring the adjacent nanostructure elements on the support such that they are electromagnetically coupled.

In one embodiment, the method comprises: configuring the nanostructure elements such that the electromagnetic field of one nanostructure element spatially overlaps that of adjacent nanostructure elements.

In one embodiment, the method comprises: configuring the plurality of nanostructure elements as an array on the support.

In one embodiment, the array comprises a substantially regular array.

In one embodiment, the nanostructure elements comprise a plurality of metallic nanorods.

In one embodiment, the method comprises: embedding the nanostructure elements within a dielectric matrix.

In one embodiment, the method comprises: providing a plurality of metamaterial elements.

A fifth aspect provides an electromagnetic waveguide transmission modulation device comprising: a pair of metamaterial elements arranged in-line within the waveguide; the metamaterial elements being arranged to be adjustable between: a first state in which the metamaterial elements operate as epsilon near zero (ENZ) metamaterial elements and form a resonant cavity within the waveguide having a transmission function which allows electromagnetic radiation of a selected frequency propagating along the waveguide to pass through the resonant cavity substantially unimpeded; and a second state in which operation of at least one of the metamaterial elements as an ENZ metamaterial is prevented and the transmission function of the waveguide is modulated.

Aspects recognise that whilst high-speed optical modulators are available commercially with a speed ranging from 10 MHz up to 50 Ghz, those optical modulators use a Mach-Zehnder interferometer with an optical nonlinear material (usually Lithium Niobate) in order to achieve those high speeds. Such optical modulators may be on-chip integrated, but typically have a large footprint, for example, a few hundred $\mu m^2$.

Aspects also recognise that the integration of optical modulators on-chip may be performed such that an electro-optic effect is generated using a very fast electrical signal in the order of tens of GHz. However, there are limitations associated with use of the electro-optic effect, since it requires considerable power for switching the optical properties of a material and the speed is typically limited by interconnections carrying an electrical signal.

Aspects and embodiments recognise that there is a need to provide a means to realise a small footprint, ultrafast, low consumption, integrated optical element, which may be used to provide a range of optical functionalities whilst being industrially transferable and CMOS compatible. Some embodiments may, for example, provide a device which can be used as an optical sensor to convert chemical information into optical data. Other embodiments may provide a device which can be used as a modulator, switch, or amplifier to manipulate and process photonic signals.

Some aspects and embodiments may offer improved functionality or performance since they may be integrally formed as part of known silicon technologies, may be relatively simply manufactured and provide improved operational speed (>100 GHz for electronically drive devices), switching time (<ns for electronically drive devices) and/or bandwidth.

Aspects and embodiments described herein recognise that the optical properties of metamaterial systems based on the arrangement of nanostructure components present an opportunity to design novel optical devices which may offer useful properties. Electromagnetic metamaterials can exhibit high sensitivity to their surroundings and thus can offer a means to create a sensitive device.

In scientific literature ENZ (epsilon-near zero) metamaterials are typically defined as anisotropic materials for which the permittivity can be described as a diagonal tensor where at least one but no more than two (out of three) components vanish (epsilon=0). When the material is represented by complex-valued permittivities, then both the real and imaginary parts of at least one, but no more than two (out of three) elements of the permittivity tensor vanish. Typical metamaterials characterised as being ENZ materials are often based on metal/dielectric composites and, as a result, while the real part of the permittivity of interest effectively vanishes at least one frequency, the imaginary component does not, therefore satisfying the epsilon=0 condition only partially, defining such materials as "epsilon-near zero" materials instead of epsilon=0 materials. Within the context of this disclosure, and for practical purposes, it is believed that a device would perform best in the epsilon=0 condition but deviations from this condition in relation to both the real and/or imaginary components of the vanishing permittivity may be acceptable for device operation but may cause deterioration in overall performance. For the metamaterial example arrangement described in more detail below, a device could retain a 20% modulation efficiency with an operational permittivity of the order of ±8±i8.

The fifth aspect provides an electromagnetic waveguide transmission modulation device in which a pair of metamaterial elements is arranged in-line within said waveguide. The device geometry may be such that two ENZ metamaterial elements are arranged in-line within a silicon waveguide. The ENZ metamaterial elements may be substantially planar and may be arranged to lie substantially transverse to the longitudinal axis of the waveguide. The planes of the ENZ metamaterial elements may be substantially aligned, or parallel with respect to each other and can be embedded in a dielectric matrix. The dielectric matrix may comprise the waveguide.

The metamaterial elements of the fifth aspect may be arranged to be adjustable between: a first state in which said metamaterial elements operate as ENZ metamaterial elements.

An "epsilon near zero" (ENZ) metamaterial structure can be fabricated in various ways. A suitable metamaterial structure will typically comprise a plurality of metallic nanostructure elements arranged within a dielectric. A metamaterial satisfying ENZ conditions occurs between a hyperbolic regime where the permittivity tensor comprises real elements of opposite sign and an elliptical regime according to which the real part of the permittivity tensor is positive. In the hyperbolic regime the optical properties for given components of the electromagnetic field behave much like they might within a metal and the material, exhibiting high reflectivity and large losses. In the elliptical regime a material typically behaves as a dielectric: exhibiting little reflectivity with low losses. A ENZ metamaterial may be constructed to "balance" the two regimes (elliptical and hyperbolic) to offer a material which has a large reflectivity yet low losses. As a result, an ENZ metamaterial mirror may perform as a perfect mirror or at least the best mirror possible given selected composition materials.

The pair of ENZ metamaterial elements may be arranged to form a resonant cavity within said waveguide when in said first state. That resonant cavity may have a transmission function which allows electromagnetic radiation of a selected frequency propagating along said waveguide to pass through said resonant cavity substantially unimpeded. Accordingly, the pair of elements may be arranged to form a Fabry-Perot cavity where the two end-mirrors comprise thin layers of metamaterial, enclosing a section of the waveguide of determined length. The geometric tunability of the metamaterial provides extensive control over both the bandwidth and the operating frequency of the device.

The pair of metamaterial elements may be switchable to a second state in which operation of at least one of said metamaterial elements as an ENZ metamaterial is prevented and the transmission function of the waveguide is modulated. A device can be designed to work at a frequency close to an inflection point of the device transmission versus frequency plot as a function of geometry. In a configuration where the device is in the "off" position, for example, the transmission of the device can be chosen to be maximal/minimal or intermediate depending on a selected device application. By arranging at least one of the metamaterial elements such that it can be switched or modulated by stimulus to no longer operate as an ENZ "mirror" means that the resonant cavity is no longer resonant and transmission of a waveguide including the pair of metamaterial elements can be modulated.

Sensing is one possible application of the proposed invention. Aspects recognise that whilst there are various commercial sensors available on the marketplace to address demands in biomedical-sensing, medical diagnostics, toxic or explosive material identification, a device in accordance with aspects and embodiments may offer improvement. Aspects recognise that an optical approach to sensing generally relies on changes in the transmittance or reflectance of a device, or components of a device, based on environmental changes occurring in the proximity of the device. Such an approach may be limited by the sensitivity level of such devices, since the sensitivity is constrained by weak light-matter interactions, as with purely transparent molecules, for example. A sensitivity improvement may be achieved by allowing for detection of nanoscale interactions with molecules. Efficient approaches relying on surface waves and other resonant effects involving surface plasmons can be implemented. Aspects may combine such approaches whilst also allowing a device to be spatially integrated in a waveguide, thus enabling, for example: high throughput, multiplexing, and/or remote sensing devices. According to some embodiments, it will be appreciated that monitoring the transmission, reflection and/or absorption characteristics of the waveguide can be used to detect or monitor the presence of a change in environment surrounding the waveguide.

Aspects and embodiments may provide an improved optical modulator. Aspects recognise that the basic function of an optical modulator is to encode one or more data streams on a carrier wave. The density of the information processed (or the channel capacity) is directly proportional to the carrier frequency, thus making the use of optical signals operating at GHz-THz attractive in comparison to low frequency electronics typically operating in the lower GHz regime. However, most commercial modulators display limited performance since the driving electronics cannot be much faster than 100 GHz due to the natural limitations of parasitic resistance-capacitance times. Aspects and embodiments may offer a means to overcome such issues. It will be appreciated that when forming a device in accordance with arrangements, the ENZ metamaterial elements may be located within a waveguide at a spacing selected in relation to a frequency of interest. That is to say, the gap between ENZ "mirrors" can be selected to provide a resonant cavity at a frequency of interest.

The thickness of the ENZ elements provided may impact upon device operation. In particular, it will be appreciated that with increasing "mirror" thickness the losses increase and therefore the value of the total transmission at the Fabry-Perot resonance decreases, thus increasing insertion loss. Thus a thinner ENZ metamaterial element can be beneficial. It will be appreciated that as the thickness of an ENZ material is reduced, the ability of the material to perform as an ENZ metamaterial may be compromised. Thus a balance must be struck between minimising losses and the ability of the device to function as intended.

Furthermore, it will be appreciated that for a waveguide of a given height, the quality of the mirror created by the ENZ metamaterial elements may be a function of a nanostructure chosen to form the ENZ metamaterial elements. In particular, if the nanostructured elements comprise one or more metallic rods embedded with a dielectric, the quality of a resulting "mirror" may be a function of: rod diameter; rod separation; and/or number of rod "layer" or rod "rows" forming the element. Good reflectivity (exceeding 90%) can be achieved using ENZ metamaterial elements comprising a single row of rods, and where the ENZ element thickness is the thickness of a single metallic rod. For such an arrangement, the reflectivity of the ENZ element may depend upon: the rod diameter and the rod separation. Rod diameters may, for example, vary between approximately 15 nm and approximately 70 nm. Rod centres may be separated by approximately 55 nm or more.

Separation of the ENZ elements within a waveguide may be selected on the basis of a propagation wavelength of interest. In particular, the approximate separation distance may be given by an integer multiple of $d = \lambda/2n_{waveguidematerial}$. For a wavelength of 1.5 µm, and a Silicon waveguide as an embedding material, the formula gives an approximate ENZ element separation of 215 nm.

Appropriate choice of construction in relation to the ENZ metamaterial elements of a device according to the first aspect can help to achieve a low energy consumption (pJ or fJ) when switching the elements between a first and second state.

In one embodiment, the device further comprises an adjuster and at least one metamaterial element is arranged to be adjusted by electro-optical, magneto-optical, acousto-optical or nonlinear optical interaction by the adjuster. Accordingly, active control of a device may be provided, the adjuster being configured to allow alteration of the optical properties of at least one metamaterial element by means of application of an appropriate electro-optical, magneto-optical, acousto-optical or nonlinear optical interaction by the adjuster In one embodiment, the metamaterial elements are integrally formed with the waveguide. Accordingly, a device can be directly integrated with waveguide, for example, silicon waveguide, technology. If integrated, a device in accordance with aspects and embodiments may provide a smaller device footprint, increase possible operating frequency and bandwidth and reduce power consumption when compared with alternative approaches.

In one embodiment, one or more metamaterial elements is formed in-line with the waveguide. In one embodiment, one or more metamaterial elements is formed within the waveguide. In one embodiment, one or more metamaterial element is arranged to span the cross-section of the waveguide.

In one embodiment, one or more metamaterial element comprises: a plurality of nanostructure elements within a dielectric matrix. The nanostructure elements may comprise a metallic material. The plurality of nanostructure elements may be configured within the dielectric matrix to allow said structure to act as an ENZ metamaterial, and the nanostructure elements are configured to cause a change in effective reflectivity of the metamaterial on application of an external trigger to adjust the device between the first mode and the second mode. Accordingly, it will be appreciated that various forms of metamaterial may be used to implement a device in accordance with aspects and embodiments described herein. In one embodiment, the metamaterial comprises an electromagnetic metamaterial. In one embodiment, the metamaterial comprises an optical metamaterial. In one embodiment, the adjacent nanostructure elements are configured within the dielectric such that they are electromagnetically coupled. In one embodiment, the nanostructure elements are configured such that the electromagnetic field of one nanostructure element spatially overlaps that of adjacent nanostructure elements. In one embodiment the metallic material comprises a metal, or an $\in$ negative material, such as an appropriately doped semiconductor or similar.

In one embodiment, the plurality of nanostructure elements comprise elongated nanostructure elements arranged such that their elongate axis is substantially parallel to the elongate axis of other nanostructure elements.

In some embodiments, the nanostructure elements are configured as an array or assembly within the dielectric. In some embodiments, the spacing between adjacent elements is chosen to be small in comparison to the wavelength of radiation intended for transmission by the waveguide. The array may comprise an irregular array. In one embodiment, the array comprises a substantially regular array. In one embodiment, the nanostructure elements comprise a plurality of metallic nanorods. In one embodiment, the nanostructure elements are embedded within a dielectric matrix. The metamaterial element may comprise a plurality of metallic nanorods of tunable diameter, length, and spacing distance which are aligned with respect to one another and embedded in a dielectric matrix. The geometric tunability of the metamaterial elements can provide extensive control over the bandwidth and the operating frequency of the device.

In one embodiment, the device comprises a plurality of "pairs" of metamaterial elements. Aspects and embodiments may allow ultrafast (THz) operation speeds with tunable broadband capacity, since a device may be configured to allow for operation with a plurality of operating frequencies. Such a device may be configured to deal with a plurality of operating frequencies. Accordingly, a plurality of pairs of metamaterial elements may be provided, each pair matched to a different frequency and each being individually and independently switchable between the first and second state.

A sixth aspect provides a method of providing an electromagnetic waveguide transmission modulation device, the method comprising: arranging a pair of metamaterial elements in-line within the waveguide; arranging the metamaterial elements to be adjustable between: a first state in which the metamaterial elements operate as ENZ metamaterial elements and form a resonant cavity within the waveguide having a transmission function which allows electromagnetic radiation of a selected frequency propagating along the waveguide to pass through the resonant cavity substantially unimpeded; and a second state in which operation of at least one of the metamaterial elements as an ENZ metamaterial is prevented and the transmission function of the waveguide is modulated.

In one embodiment, the method comprises: configuring the metamaterial element to allow adjustment between the first and second mode, by means of modification of optical properties of at least one of said metamaterial elements.

In one embodiment, the method comprises: providing an adjuster and arranging the metamaterial element to be adjusted by electro-optical, magneto-optical, acousto-optical or nonlinear optical interaction by the adjuster.

In one embodiment, the method comprises: integrally forming the pair of metamaterial elements are with the waveguide.

In one embodiment, the method comprises: forming the metamaterial elements in-line with the waveguide.

In one embodiment, at least one of metamaterial elements comprises: a plurality of nanostructure elements comprising a metallic material; the plurality of nanostructure elements being configured on the support to allow the structure to act as an ENZ metamaterial, wherein the nanostructure elements are configured to cause a change in reflectivity of the metamaterial on application of an external trigger to adjust the device between the first mode and the second mode.

In one embodiment, the metamaterial comprises: an electromagnetic metamaterial. In one embodiment, the method comprises: metamaterial comprises an optical metamaterial.

In one embodiment, the method comprises: configuring the adjacent nanostructure elements such that they are electromagnetically coupled.

In one embodiment, the method comprises: configuring the nanostructure elements such that the electromagnetic field of one nanostructure element spatially overlaps that of adjacent nanostructure elements.

In one embodiment, the method comprises: configuring the plurality of nanostructure elements as an array.

In one embodiment, the nanostructure elements comprise: a plurality of metallic nanorods.

In one embodiment, the nanostructure elements are embedded within a dielectric matrix.

In one embodiment, the method comprises: providing a plurality of pairs of metamaterial elements.

Although the third, fourth, fifth and sixth aspect have been described in relation to an electromagnetic waveguide transmission modulation device, it will be appreciated that the principles described may be applied to any material which can act to guide electromagnetic waves, and in particular to any material or geometry that will allow, for example, light to escape and be collected.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which:

FIG. 1a illustrates schematically main features of a device according to one embodiment as a cross-section;

FIG. 1b is a schematic top view of the device shown in FIG. 1a;

FIG. 2a illustrates schematically a device such as that illustrated in FIG. 1a when in an "on" state;

FIG. 2b illustrates schematically a device such as that illustrated in FIG. 1a when in an "off" state;

FIG. 2c illustrates one possible example of extinction ratios obtained as a refractive index in an optical cavity of a device such as that shown in FIG. 1a is varied;

FIG. 2d is a schematic illustration of a device according to one embodiment, in which electrical operation can be implemented to offer an extinction ratio in the region of between 1-2 dB if 2V is applied across a multilayer surface as illustrated;

FIG. 3a illustrates schematically a device according to one embodiment;

FIG. 3b illustrates schematically an example of directionality for a double slit structure such as that shown in FIG. 3a as cavity length varies;

FIG. 4a illustrates schematically a multilayer system for use in a device in accordance with one embodiment;

FIG. 4b illustrates schematically a device such as that illustrated in FIG. 4a when in an "on" state;

FIG. 4c illustrates schematically a device such as that illustrated in FIG. 4a when in an "off" state;

FIG. 4d illustrates an example of extinction ratios obtained as applied voltage is varied in a device such as that illustrated in FIG. 4a;

FIG. 5a is a 3-dimensional representation of a modulator according to one embodiment;

FIG. 5b illustrates schematically the modulator of FIG. 5a when in an "off" state;

FIG. 5c illustrates schematically the modulator of FIG. 5a when in an "on" state;

FIG. 6 is a 3-dimensional representation of a modulator according to an alternative embodiment;

DESCRIPTION OF THE EMBODIMENTS

Figure 7:
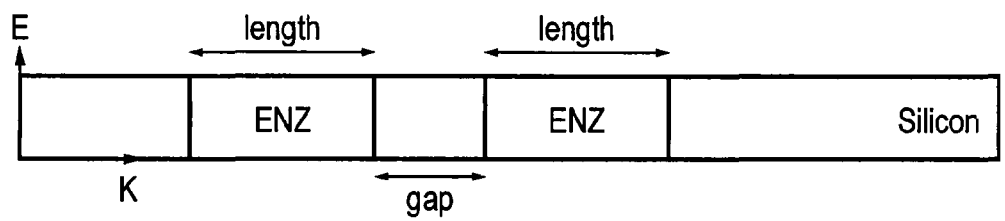
FIG. 7 illustrates schematically main components of a device according to one arrangement.

According to some aspects and embodiments, a device based on a resonant cavity structure is provided. The device is arranged such that active control of a plasmonic signal is permitted. That control is achieved by exploiting the presence of electromagnetic cavity modes in the cavity structure.

FIG. 1a illustrates schematically main features of a device 10 according to one embodiment as a cross-section and FIG. 1b is a schematic top view of the device shown in FIG. 1a. According to one embodiment, the device may generally comprise: two parallel metallic films 20a, 20b, separated by a spacer layer 30. In the embodiment shown, the metallic films comprise gold films. According to this embodiment, a slit 40 is provided in the lower gold film 20a, and that slit is illuminated from beneath at normal incidence. It will be appreciated that in some embodiments, the slit need not be illuminated at normal incidence. The upper gold film 20b has a length W and width B and is spaced from the lower film 20a by a distance S. It will be understood that the example shown is substantially 2-dimensional, but that a 3-dimensional configuration may also be implemented.

FIG. 2a illustrates schematically a device such as that illustrated in FIG. 1a when in an "on" state. FIG. 2b illustrates schematically a device such as that illustrated in Figure is when in an "off" state. FIG. 2c illustrates one possible example of extinction ratios obtained as a refractive index in an optical cavity of a device such as that shown in FIG. 1a is varied and FIG. 2d is a schematic illustration of a device according to one embodiment, in which electrical operation can be implemented to offer an extinction ratio in the region of between 1-2 dB if 2V is applied across a multilayer structure as illustrated. Further detail regarding operation of a device as shown in FIGS. 2a to 2d is set out below:

Optical Cavity

A device in accordance with described aspects and embodiments may function by utilising either optical or plasmonic resonances, in dependence upon device dimensions. One method of operation comprises taking appropriate steps to inhibit the coupling of electromagnetic radiation, for example, radiation in the optical region of the spectrum, to SPPs which exist at the surface of a device surface, by employing optical Fabry Perot modes which can be supported by the cavity structure of the device. Such Fabry Perot modes can be supported by the cavity structure when feed radiation in the optical region of the spectrum is introduced into the cavity, provided the separation (S) between reflective surfaces of the cavity, for example, gold layers, is sufficiently large (typically in the range of 200 nm to micrometers).

It will be understood by those skilled in the art that, in an embodiment of a device such as that shown in FIG. 2a, if a slit 40 is illuminated by electromagnetic radiation 50 in the optical region of the spectrum, light may couple directly to SPPs 60 on the lower gold film surface 20a by scattering from the slit. As a result of destructive interference between two scattering amplitudes from the slit and Fabry-Perot cavity, the SPP intensity exhibits sharp minima at or close to the resonant frequencies of the optical cavity modes. That phenomenon may be understood in terms of a Fano resonance, which describes interaction between coupled scattering channels. The effect arises whenever scattering via two pathways interferes. In this case, the two channels correspond to the scattering from the slit and the scattering from the Fabry-Perot cavity.

According to one implementation, and as described in relation to FIG. 2a and FIG. 2b, minima in the plasmonic signal may be used to define an 'off' state of a switch and it will be understood that the cavity structure of a device according to some embodiments effectively acts to inhibit SPP generation. The minima in a monitored plasmonic signal will typically be below the level of a background signal when the device is in the "off" state.

To attain an 'on' state, as shown in FIG. 2a, the optical path inside the cavity, perpendicular to the gold films, is constructed or formed such that it is tuned to reduce destructive interference. Active control may be achieved by, for example, utilising a nonlinear Kerr effect. By incorporating a nonlinear material into the cavity, the refractive index of the material inside the cavity may be optically modulated to change the optical path inside the cavity and yield the desired switching. That arrangement is illustrated schematically in FIG. 2c and FIG. 2d.

In some embodiments, the switching of the device may be operated electrically. For example, in some embodiments, utilising refractive index modulation which stems from an increase in carrier concentration in a conductive material (oxide), for example, Indium Tin Oxide (ITO), can be successfully used as a switching mechanism. In order to employ such an effect, embodiments may be provided according to which a thin multilayer 200 replaces the upper reflector 20b of the embodiment shown generally in FIG. 1. In one embodiment, such as the embodiment shown in FIG. 2d, the thin multilayer 200 may comprise two optically transparent gold films separated by a layer of each of Indium Tin Oxide (ITO) and Hafnium Oxide (HfO). When a voltage is applied, the index modulation enhances reflection from the interface, hence effectively modifying the resonance condition of the cavity. It will be appreciated that other switch triggers are possible, including, for example, mechanical pressure.

In some embodiments (not shown) a grating or other optical source can be arranged to both feed the cavity and generate SPPs. That structure may replace the slit shown in the embodiment of FIG. 1. In some embodiments, a hemispherical upper reflector can be used to provide the necessary conditions for switching. It will be appreciated that the embodiment shown in FIG. 1 is a substantially 2-dimensional device and that in such an arrangement, a feed slit is most appropriate. In the case of a 3-dimensional device, a suitable feed may comprise an opening in the form of a hole, rather than an elongate opening such as a slit.

FIG. 3a illustrates schematically a device according to one embodiment and FIG. 3b illustrates schematically an example of directionality for a double slit structure such as that shown in FIG. 3a as cavity length varies. Directionality is defined as the ratio of SPP intensity in a unique direction to the total SPP intensity; Directionality=1 corresponds to SPPs excited only to the left, 0: only to the right, and 0.5 equates to symmetric coupling.

In the embodiment shown in FIG. 3a, two feed slits are provided 40a and 40b in the lower gold film 20a. Those two slits are asymmetrically located in length W of the device and have differing slit widths as shown. It will be appreciated that the lineshape of the Fano resonance is heavily dependent on the dimensions of the resonant cavity structure and illumination conditions. That is to say, an asymmetry parameter can be controlled by altering the effective coupling parameter between the continuum and the discrete channel, in addition to varying the phase between the two channels. In some embodiments, the phase change associated with the optical resonance can be harnessed to modify the phase of the SPPs launched by the slit, thus allowing for a degree of control over the direction of SPP excitation when phase matching structures, for example, double slits of different widths, are employed.

Plasmonic Cavity

FIG. 4a illustrates schematically a multilayer system for with a device having a plasmonic cavity. As shown in FIG. 4a, a device 10 generally comprises: two parallel metallic films 20a, 20b, separated by a spacer 30, which in the embodiment shown comprises two spacer layers 30a, 30b. In the embodiment shown, the metallic films comprise gold films and the spacer layers a layer of each of Indium Tin Oxide (ITO) and HfO. According to this embodiment, a slit 40 is provided in the lower gold film 20a, and that slit is illuminated from beneath at normal incidence.

FIG. 4b illustrates schematically a device such as that illustrated in FIG. 4a when in an "on" state in which a plasmonic resonance present in the cavity, located either side of the slit, generates single interface SPPs outside the cavity. FIG. 4c illustrates schematically a device such as that illustrated in FIG. 4a when in an "off" state in which losses experienced by the plasmonic modes in the cavity inhibit the excitation of SPPs on the adjacent gold film.

FIG. 4d illustrates an example of extinction ratios obtained as applied voltage is varied in a device such as that illustrated in FIG. 4a.

It will be appreciated that in some embodiments, a mode of operation may be implemented which reduces separation between the two gold films of a cavity structure such as that shown schematically in FIG. 1, such that the structure is arranged to act as a plasmonic resonator. According to such embodiments, one possible implementation being shown in FIG. 4a, spacing between reflective surfaces of the cavity, S, is typically in the region of 10 to 50 nm. According to such embodiments, a device is operable to support Fabry-Perot resonances based on plasmonic slot modes, which are able to generate single interface SPPs external to the cavity and enhanced excitation occurs at the slot mode resonance. According to such embodiments, the plasmonic slot mode resonances are parallel to the reflective surfaces, for example, gold films in an arrangement such as that shown schematically in FIG. 1, and thus the width of the cavity (W) must be tuned to ensure resonance conditions are achieved. It will be appreciated that in this case, there may be no need to provide a feed. Plane wave excitation may be sufficient to provide a workable device. Furthermore, it will be appreciated that the position of a feed, for example, an opening in the form of a slit, or hole, may be tuned to provide a desired device It will be appreciated that, in a manner similar to that described above in relation to a photonic cavity, incorporating layers of conductive oxide and a dielectric, for example, ITO and $HfO_2$, in the reflective wall structure of a cavity can facilitate switching of a signal with an applied voltage. Such an implementation is shown in FIG. 4a. In this case, incorporation of appropriate spacer layers and application of an appropriate voltage can increase losses experienced by the slot modes as a result of increased electron density at the semiconductor/dielectric interface.

The cavity structure of aspects and embodiments described herein can offer high extinction ratios, together with reduced dimensions when compared to similar systems. The structures of aspects and embodiments described herein can be tailored for integration with VCSELs, which offer an efficient platform for SPP excitation, allowing the realisation of an on-chip, plasmonic switch. It will be appreciated that aspects and embodiments described herein may be used in applications including, for example, plasmonic switches and modulators, pressure sensors, acoustic wave sensors and similar devices.

FIG. 5a is a 3-dimensional representation of a modulator according to one embodiment. According to one embodiment of a modulator, a device geometry such as that shown in FIG. 5a may be provided. Such an embodiment may be configured to be coupled to a waveguide. The device of the embodiment shown is based upon use of a metallic nanorod array metamaterial as coupled to a silicon (Si) waveguide. It will be appreciated that it is possible to implement arrangements which are provided for non-silicon waveguides. The metamaterial in the embodiment shown comprises a plurality of metallic nanorods of tunable diameter, length, and spacing distance which are aligned with respect to one another and embedded in a dielectric matrix. The geometric tunability of the metamaterial provides extensive control over both the bandwidth and the operating frequency of the device. In the embodiment illustrated, thin layers of gold and Tantalum oxide ($Ta_2O_5$) are introduced in the bottom of the metamaterial element.

It will be appreciated that the metamaterial of the device can be integrated into or onto a Si-waveguide to form the device whose purpose is to enable a dynamical control over transmission, reflection and/or absorption of an adjacent silicon waveguide.

It has been found that the transmittance of the Si waveguide as a function of the optical properties of the device demonstrates strong transmission modulation via modification of optical properties of the embedding matrix of the metamaterial by, for example, electro-optical, magneto-optical, acousto-optical or nonlinear optical interactions, or by using other nonlinearity of the metamaterial itself. A device in accordance with some aspects and embodiments can be configured or designed to operate at a frequency close to an inflection point of the transmission versus frequency characteristics. In a configuration where a device is in the "off" position, for example, the transmission of the device can be chosen to be maximal/minimal or intermediate in dependence upon an envisaged application. If the transmission is maximal, the propagation of light in the waveguide is not altered by the presence of the device, since the device is configured such that the impedance of the waveguide and device is matched. It will be appreciated that small changes in the optical properties of a device will then affect the transmission of the waveguide. FIG. 5b illustrates schematically the modulator of FIG. 5a when in an "off" state; and FIG. 5c illustrates schematically the modulator of FIG. 5a when in an "on" state.

When used as a sensor for example, a material or property to be sensed in the form of a gas, liquid or solid, may permeate the structure of the metamaterial such that the optical properties of the metamaterial are changed or modified, that modification impacting transmission of the waveguide.

In one embodiment, in which a waveguide including a metamaterial in accordance with aspects and embodiments described, is configured to operate as a modulator, ultrafast, for example, picosecond thermal properties of both free and bound electron density in the metallic nanorods of a structure such as that shown in FIG. 5a can be used to modulate the transmission/reflection/absorption of the waveguide.

Alternative ultrafast mechanisms based on optical properties of the embedding medium in interaction with the nanorods may also be implemented. For example, in some embodiments, the embedding material may comprise an oxide or suitably chosen resonant or non-resonant material.

It will be appreciated that a device in accordance with aspects and embodiments may be integrated into ultrafast photonic switches, and may be silicon-photonics compatible. Furthermore, such a device may be used to form part of an integrated bio- or chemical sensor.

FIG. 6 is a 3-dimensional representation of a modulator according to an alternative embodiment. In the embodiment shown in FIG. 6, the metamaterial element is formed in-line and integrally with the waveguide, rather than being located adjacent a wave guide as in the embodiment shown in FIG. 5.

FIG. 7 illustrates schematically the main components of a device according to one arrangement. The device geometry of the arrangement shown comprises: two ENZ metamaterial elements arranged in-line within a silicon waveguide. The ENZ metamaterial elements in the arrangement shown are integrated into a waveguide. The ENZ metamaterial elements may be substantially planar and are arranged to lie substantially transverse to the longitudinal axis of the waveguide. The planes of the ENZ metamaterial elements may be substantially aligned, or parallel with respect to each other and can be embedded in a dielectric matrix. The dielectric matrix may comprise the waveguide.

It will be appreciated that an ENZ metamaterial structure can be fabricated in various ways. A suitable metamaterial structure will typically comprise a plurality of metallic nanostructure elements arranged within a dielectric. A metamaterial satisfying ENZ conditions occurs in anisotropic media between hyperbolic and elliptic regimes. In the hyperbolic regime a material typically exhibits high reflectivity at an interface with another material but has large losses. In the elliptic regime a material typically exhibits low reflectivity at an interface with another material with no losses. An ENZ metamaterial may be constructed to "balance" the two properties to offer a material which has a large reflectivity at an interface with another material yet low losses. As a result, an ENZ metamaterial mirror may perform as a perfect mirror or at least the best mirror possible given selected composition materials.

It will be appreciated that a modulation device in accordance with the arrangement shown in FIG. 7 represents a Fabry-Perot cavity where the two end-mirrors comprise thin layers of metamaterial, enclosing a section of the waveguide of determined length. The geometric tunability of the metamaterial (which can be a multilayer) provides extensive control over both the bandwidth and the operating frequency of the device. ENZ materials provide extensive spectral tunability, low material losses (the mirror formed is an effective medium with low lossy material content), and strong ultrafast response, due to the nanostructured composition of the mirrors.

The metamaterial elements enable ultrafast dynamic control over the transmission, reflection and/or absorption properties of the waveguide. In particular, the transmittance of the Si waveguide as a function of the optical properties of the device demonstrates strong transmission modulation via the modification of the optical properties of the metamaterial by electro-optical, magneto-optical, acousto-optical or non-linear optical interactions.

A device can be designed to work at a frequency close to an inflection point of the device transmission versus frequency plot. In a configuration where the device is in the "off" position, for example, the transmission of the device can be chosen to be maximal/minimal or intermediate depending on a selected device application. If the transmission is maximal, the propagation of a selected frequency of electromagnetic radiation in the waveguide may be such that is not altered by the presence of the device. The impedance of the device is matched to the impedance of the waveguide. Small changes in the optical properties of the device affect the transmission of the waveguide. When used as a sensor, for example, a material to be sensed (gas, liquid, solid) may permeate or be in the vicinity of the metamaterial, modify its optical properties and affect the transmission of the waveguide. In a simple configuration as a modulator, the ultrafast (femtosecond) thermal properties of both the free and bound electron density in, for example, the metallic nanostructures provided in the ENZ metamaterial can be used to modulate the transmission/reflection/absorption of the waveguide. In some arrangements alternative ultrafast mechanisms based on the optical properties of the embedding medium in interaction with the metallic nanostructures forming the metamaterial may also be utilised.

It will be appreciated that when forming a device in accordance with arrangements, the ENZ metamaterial elements may be located within a waveguide at a spacing selected in relation to a frequency of interest. That is to say, the gap between ENZ "mirrors" can be selected to provide a resonant cavity at a frequency of interest.

Similarly, it will be appreciated that in order to perform acceptably, the thickness of the ENZ elements provided may impact upon device operation. In particular, it will be appreciated that with increasing "mirror" thickness the losses increase and therefore the value of the total transmission at the Fabry-Perot resonance decreases, thus increasing insertion loss. Thus a thinner ENZ metamaterial element can be beneficial. It will be appreciated that as the thickness of an ENZ material is reduced, the ability of the material to perform as an ENZ metamaterial may be compromised. Thus a balance must be struck between minimising losses and the ability of the device to function as intended.

In the general arrangement shown schematically in FIG. 7, both metamaterial elements are configurable to operate in an ENZ condition, which means the metamaterial elements can be switched between operating as a mirror being arranged to have a transmission close to 1. The closer the transmission is to 1 in the Fabry-Perot cavity the lower the insertion loss and the better the modulator may operate.

Figure 8:
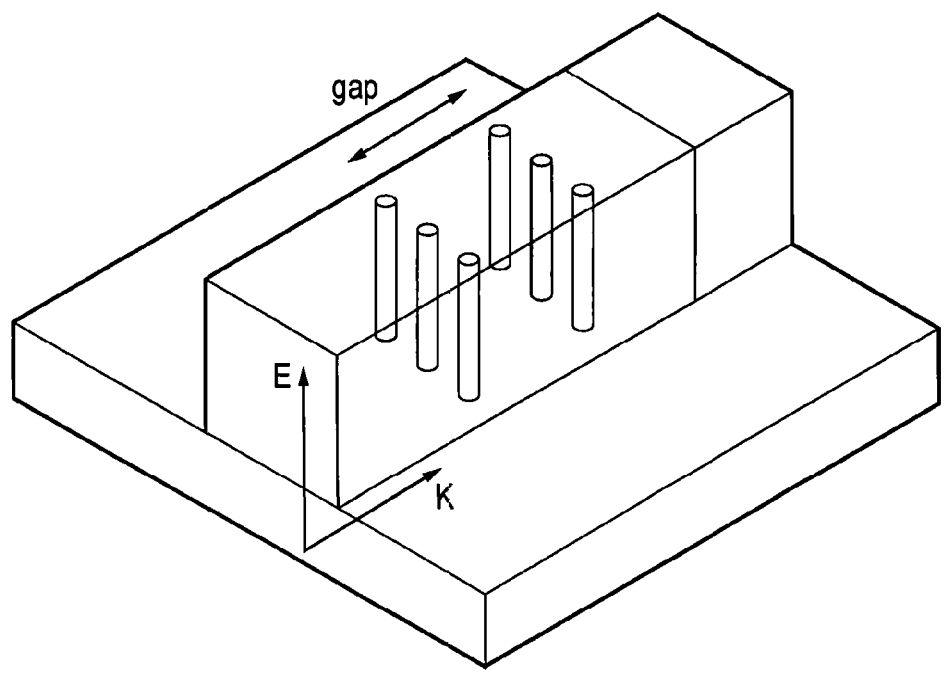
FIG. 8 is a perspective view of a schematic representation of a device according to one arrangement.

FIG. 8 is a 3-dimensional representation of a modulator according to one embodiment. In the arrangement shown in FIG. 2 the ENZ "mirrors" are formed from metallic rods in a dielectric material. The ENZ metamaterial elements in the arrangement shown each comprise a metallic nanorod array. The ENZ metamaterial elements are formed from a plurality of metallic nanorods. The dimensions and arrangement of the nanorods and of the metamaterial elements within the waveguide may be chosen to perform according to a proposed application of a device. Such tunability of a device to an envisaged application can be achieved in relation to the ENZ metamaterial elements since the metallic nanorods forming the ENZ metamaterial elements may have, for example: a tunable diameter, length and/or spacing distance.

As described in relation to the general arrangement shown in FIG. 7, an interesting behaviour is exhibited by waveguide structures comprising consecutive nanorod slabs. At the ENZ condition, the metamaterial element slab becomes highly reflective (as n=0 reflection coefficient=1) which leads to the creation of standing waves within the device. Such an arrangement can allow high transmission through the device in the same manner as a Fabry-Perot resonator. In reality, the ENZ metamaterial comprises a metallic nanorod structure, which can have large losses. The standing waves cannot be supported unless the losses are sufficiently small. One way to reduce losses is to reduce the number of rods needed (thus reducing the amount of metal) to create an ENZ slab.

Consider, for example, the structure shown schematically in FIG. 8. For a certain value of the gap, the transmission of the structure is 1 for a given frequency due to the creation of a standing wave within the device (Fabry-Perot resonance). The thickness of the ENZ metamaterial elements (slabs) can lead to significant losses. Losses can be minimized by reducing the length (thickness) of the ENZ material, although care must be taken since typically an ENZ structure will be fabricated in accordance with conditions derived from an effective medium theory of an infinite slab and therefore the "length" of the slab should not be reduced further than a single unit of the effective medium (in this case one nanorod diameter).

The structure shown schematically in FIG. 8 comprises two ENZ metamaterial elements. The ENZ elements comprise a plurality of gold nanostructure rods embedded in a dielectric medium.

Figure 9:
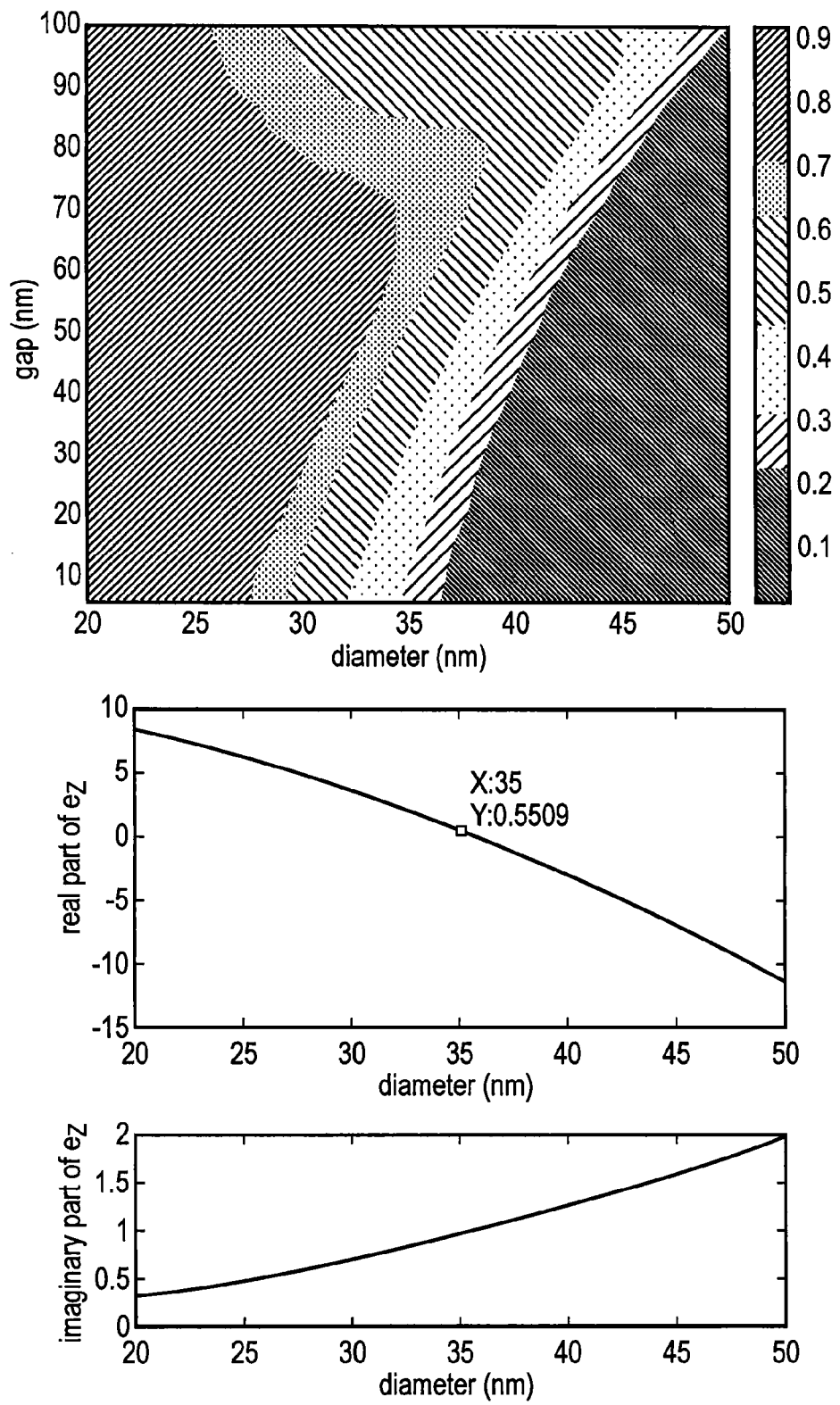
FIG. 9 is a graphic representation of optical properties of a device according to one arrangement.
Figure 10:
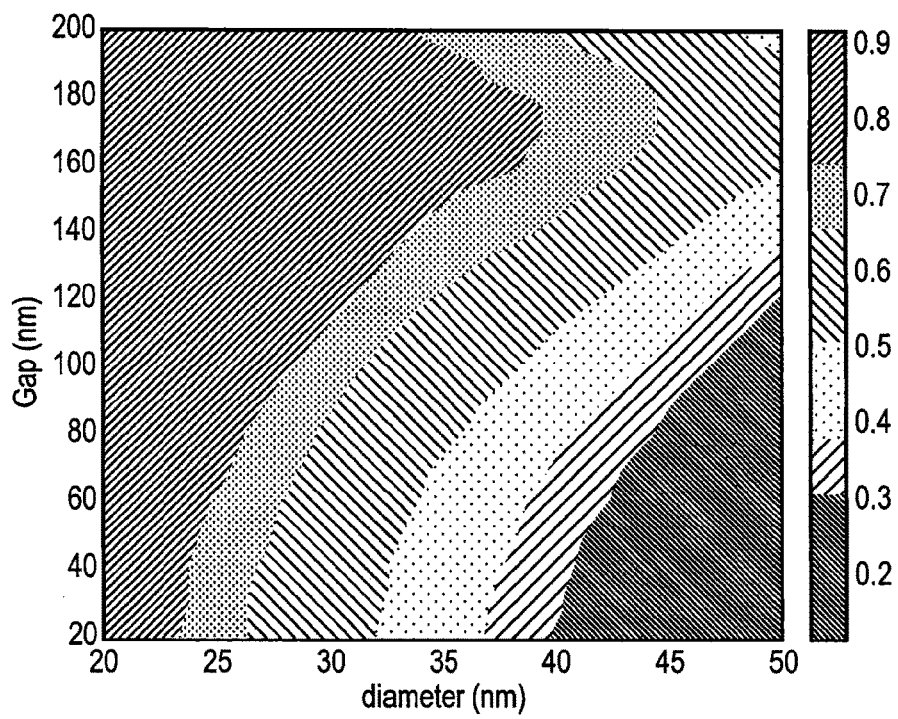
FIG. 10 is a graphic representation of real and imaginary parts of epsilon z according to one arrangement.
Figure 11:
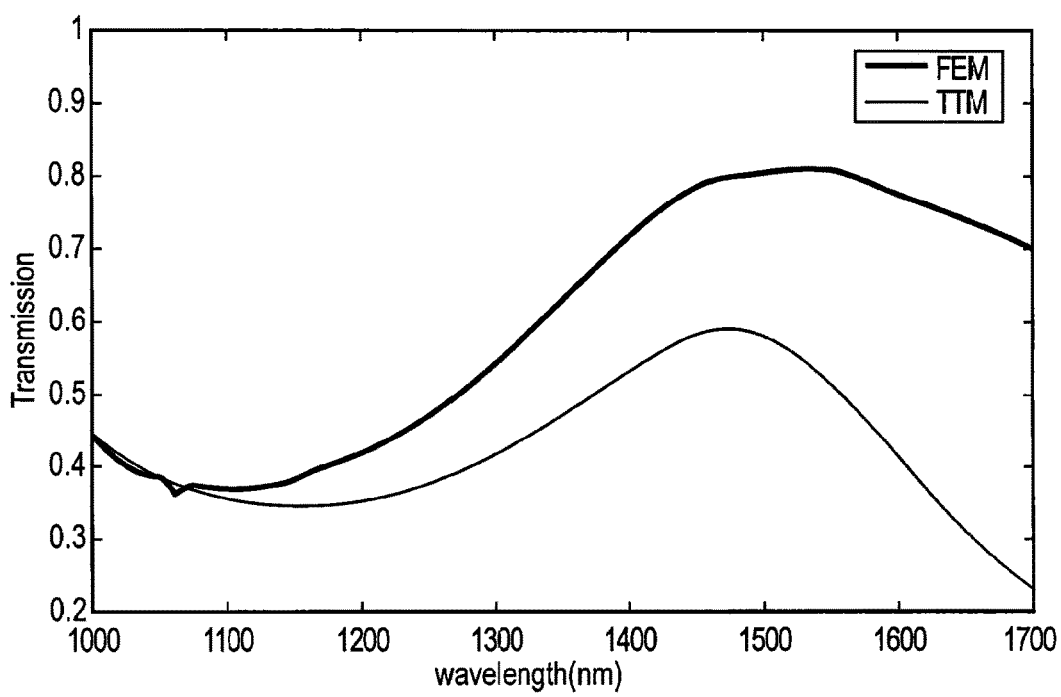
FIG. 11 is a graphic representation of optical properties of a device according to one arrangement.

FIGS. 9 to 11 illustrate graphically a mathematical analysis of the transmission of a structure such as that shown in FIG. 8. The analysis assumes an effective medium theory for a metamaterial slab having a length of one nanorod diameter (50 nm) the model allows both the rod diameter and gap between ENZ elements to be changed to scan the effective permittivity of the medium through the ENZ condition and to obtain the condition for maximum transmission. A simple transfer matrix method (TMM) analysis is implemented to calculate the transmission of the device. In relation to FIG. 9 the surface plot represents the transmittance of the modulator as a function of inter-rod distance and rod diameter. The 2-D plots illustrate the real and imaginary parts of the z-component of the permittivity tensor as a function of rod diameter. The x,y components are positive and not dispersive. ENZ conditions are achieved for a rod diameter of around 35 nm.

The structure shown in FIG. 8 is simulated fully in 3D, accounting for the nanostructured geometry of the metamaterial using COMSOL, and its transmission is calculated for a first TM-like mode (transverse magnetic) and plotted against rod diameter and gap. In the simulated structure a glass substrate is assumed, together with a mode frequency corresponding to a free space wavelength of 1.5 um. The waveguide simulated is 300 nm wide and 340 nm high.

FIG. 9 illustrates the transmission of one device against both rod gap and diameter using TMM. In the mathematical example shown, a mathematical model comprising nanorods embedded within silicon having n=3.48 is used to allow for comparison with real fabricated devices. In other words, the mathematical model can be compared with empirical results from fabricated prototypes formed in accordance with those parameters. The real and imaginary part of eps_z are also plotted in FIG. 9 for ease of reference.

FIG. 10 illustrates the transmission against both gap and diameter for the case of the 3D simulation. The gap in the finite element 3D model is different to the gap in the TMM in the sense that while in the TMM the minimum length of the slab is related to the size of a unit cell (given by the period of a nanorod array), whereas in the model of FIG. 10 the nanorods can be as close as desired, subject to the diameter of the nanorod, and analysis can be performed.

For a rod diameter of 35 nm and a spacing of 80 nm which corresponds to the increased transmission in FEM simulations, the wavelength behaviour was calculated and is shown in FIG. 11. The blue transmission profile corresponds to a full 3D finite element (FEM) calculation of the modulator. The TMM plot refers to an equivalent effective medium theory calculation.

Simulations reveal that for a single cell of effective medium the losses are higher than for a single real cell (comprising a single rod inside a waveguide). This can be understood since in the example arrangements considered the single cell is geometrically closer to a gold layer of few nanometers (related to the diameter of the rod) than to an array of rods with an effective loss. Such an analysis can explain the increased transmission in the case of FEM.

Calculations were also done to simulate use of a AAO instead of silicon as an embedding medium. Although stronger resonances are seen in simulations of such an arrangement, the simulation also indicates that mismatch between a propagating mode in silicon and in AAO, can lead to a drop in transmission through a real nanostructured component. A waveguide made of AAO is likely to give better results, although an AAO waveguide typically requires a larger height of the waveguide and longer rods (in the order of 500 or 600 nm). The size of the device can be as large as 180 nm from the FEM simulation, and simulations indicate that with a drop in the total transmission of 0.17, the device has relatively small insertion losses and integrability. Furthermore, if the device is used as a modulator: in the ON state it has low transmission and in the OFF state it has large transmission. Therefore this device may be particularly energy efficient when integrated into an optical circuit compared to alternative modulator arrangements.

For the case investigated using gold nanorods, it has been determined that the maximum transmission at the Fabry-Perot resonance condition is 0.86 dropping down to 0.5 under optical pumping. It will be appreciated that other materials may provide an improved performance.

Use of rods in the illustrated example gives a tuned ENZ condition at the selected working wavelength (1.5 um). In the case of the illustrated simulated modulator the anisotropic nature of the rods have the result that the switchable ENZ behaviour will only work for TM polarized modes (electric field along the longitudinal axis of the rod) however for TE polarized modes (electric field perpendicular to the longitudinal axis of the rod) the permittivity is not zero but close to that of the silicon waveguide and therefore it will be transparent at this polarization. Such an effect can, in some arrangements, then be used for polarization modulation.

General Structure

It will be appreciated that it is possible to implement arrangements which are provided for non-silicon waveguides. The metamaterial in the embodiment shown comprises a plurality of metallic nanorods of tunable diameter, length, and spacing distance which are aligned with respect to one another and embedded in a dielectric matrix. The geometric tunability of the metamaterial provides extensive control over both the bandwidth and the operating frequency of the device.

It will be appreciated that a device in accordance with aspects and embodiments may be integrated into ultrafast photonic switches, and may be silicon-photonics compatible. Furthermore, such a device may be used to form part of an integrated bio- or chemical sensor.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

The invention claimed is:

1. A plasmonic switching device comprising:
a resonant cavity formed between surfaces, one of said surfaces comprising a plasmonic system operable to support at least one plasmonic mode;
an electromagnetic radiation feed arranged to couple electromagnetic radiation into said resonant cavity and said at least one plasmonic mode;
wherein said resonant cavity is arranged to be switchable between:
a first state in which said resonant cavity has an operational characteristic selected to allow resonance of said electromagnetic radiation at a frequency of said at least one plasmonic mode such that excitation of said at least one plasmonic mode is inhibited in said plasmonic system; and
a second state in which said operational characteristic of said resonant cavity is adjusted to inhibit resonance of said electromagnetic radiation at a frequency of said at least one plasmonic mode such that said at least one plasmonic mode is excited in said plasmonic system.

2. The plasmonic switching device according to claim 1, wherein said plasmonic system surface comprises an interface between a metal and a dielectric.

3. The plasmonic switching device according to claim 2, wherein said operational characteristic comprises: reflectivity of at least one of said surfaces of said cavity.

4. The plasmonic switching device according to claim 3, wherein one of said surfaces is configured to have a variable effective refractive index and the resonance condition of said resonant cavity is changed as said effective reflectivity of said surface is varied.

5. The plasmonic switching device according to claim 4, wherein said operational characteristic comprises: at least one effective dimension of said cavity.

6. The plasmonic switching device according to claim 5, wherein said dimension comprises an effective spacing between said surfaces.

7. The plasmonic switching device according to claim 6, wherein said spacing between said surfaces comprises a dielectric configured to have a variable effective refractive index.

8. The plasmonic switching device according to claim 7, wherein said refractive index varies upon application of a voltage or optical field across said dielectric enabling refractive index modulation stemming from an increase in carrier concentration in said dielectric.

9. The plasmonic switching device according to claim 8, wherein said dielectric comprises a multilayer structure formed from at least one of: Indium Tin Oxide, Hafnium Oxide, Gold, Copper, or Silver.

10. The plasmonic switching device according to claim 9, wherein said electromagnetic radiation feed comprises: a source of electromagnetic radiation which enters said cavity via at least one opening provided in one of said surfaces, said opening being arranged such that photons scattered from said opening are coupleable to plasmons at said plasmonic system.

11. The plasmonic switching device according to claim 10, wherein said at least one opening is provided in said surface comprising said plasmonic system.

12. The plasmonic switching device according to claim 10, wherein said at least one opening is configured symmetrically within said device such that excitation of said plasmonic mode in said device is symmetrical.

13. The plasmonic switching device according to claim 10, wherein said at least one opening is arranged to have different dimensions to another of said at least one opening, such that excitation of said plasmonic mode in said device is asymmetrical.

14. The plasmonic switching device according to claim 10, wherein said device further comprises: a plasmonic mode detector.

15. A method of providing a plasmonic switching device comprising:
forming a resonant cavity between surfaces, one of said surfaces comprising a plasmonic system operable to support at least one plasmonic mode;
arranging an electromagnetic radiation feed to couple electromagnetic radiation into said resonant cavity and said at least one plasmonic mode;
arranging said resonant cavity to be switchable between:
a first state in which said resonant cavity has an operational characteristic selected to allow resonance of said electromagnetic radiation at a frequency of said at least one plasmonic mode such that excitation of said at least one plasmonic mode is inhibited in said plasmonic system; and
a second state in which said operational characteristic of said resonant cavity is adjusted to inhibit resonance of said electromagnetic radiation at a frequency of said at least one plasmonic mode such that said at least one plasmonic mode is excited in said plasmonic system.

16. A switching device comprising:
a resonant cavity formed between surfaces; and an electromagnetic radiation feed arranged to couple electromagnetic radiation into the resonant cavity;
wherein the resonant cavity is arranged to switch the electromagnetic feed between:
a first state in which the resonant cavity has an operational characteristic selected to allow said cavity to be is driven close to resonance such that passage of the electromagnetic feed through the cavity is inhibited; and
a second state in which an operational characteristic of the resonant cavity is adjusted to inhibit cavity resonance such that passage of the electromagnetic feed through the cavity is supported.

17. The method according to claim 15, wherein one of said surfaces comprises a variable effective refractive index, and wherein a resonance condition of said resonant cavity is changed as said effective reflectivity of said surface is varied.

18. The method according to claim 15, further comprising forming an effective spacing between said surfaces of the resonant cavity.

19. The method according to claim 18, wherein the effective spacing between said surfaces of the resonant cavity comprises a dielectric having a variable effective refractive index.

20. The method according to claim 19, wherein said refractive index varies upon application of a voltage or optical field across said dielectric.

* * * * *